US010067782B2

(12) United States Patent
Chin et al.

(10) Patent No.: US 10,067,782 B2
(45) Date of Patent: *Sep. 4, 2018

(54) EFFICIENT DETECTION AND RESPONSE TO SPIN WAITS IN MULTI-PROCESSOR VIRTUAL MACHINES

(71) Applicant: Microsoft Technology Licensing, LLC, Redmond, WA (US)

(72) Inventors: Yau Ning Chin, Seattle, WA (US); John Te-Jui Sheu, Redmond, WA (US); Arun Kishan, Bellevue, WA (US); Thomas Fahrig, Redmond, WA (US); Rene Antonio Vega, Scotts Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/945,206

(22) Filed: Nov. 18, 2015

(65) Prior Publication Data

US 2016/0154666 A1 Jun. 2, 2016

Related U.S. Application Data

(63) Continuation of application No. 12/182,971, filed on Jul. 30, 2008, now Pat. No. 9,201,673.

(51) Int. Cl.
*G06F 9/455* (2018.01)
*G06F 9/52* (2006.01)

(52) U.S. Cl.
CPC ...... *G06F 9/45558* (2013.01); *G06F 9/45533* (2013.01); *G06F 9/526* (2013.01); *G06F 2009/4557* (2013.01)

(58) Field of Classification Search
None
See application file for complete search history.

(56) References Cited

U.S. PATENT DOCUMENTS 6,105,053 A 8/2000 Kimmel et al.
6,766,515 B1 * 7/2004 Bitar ..................... G06F 9/4843
712/228

(Continued)

OTHER PUBLICATIONS

Hohmuth et al., Pragmatic Nonblocking Synchronization for Real-Time Systems, 2001, pp. 1-15.

(Continued)

*Primary Examiner* — George Giroux
(74) *Attorney, Agent, or Firm* — Baker & Hostetler LLP

(57) ABSTRACT

Various aspects are disclosed herein for attenuating spin waiting in a virtual machine environment comprising a plurality of virtual machines and virtual processors. Selected virtual processors can be given time slice extensions in order to prevent such virtual processors from becoming de-scheduled (and hence causing other virtual processors to have to spin wait). Selected virtual processors can also be expressly scheduled so that they can be given higher priority to resources, resulting in reduced spin waits for other virtual processors waiting on such selected virtual processors. Finally, various spin wait detection techniques can be incorporated into the time slice extension and express scheduling mechanisms, in order to identify potential and existing spin waiting scenarios.

20 Claims, 10 Drawing Sheets

(56) References Cited

U.S. PATENT DOCUMENTS

| | | |
|---|---|---|
| 2004/0268347 A1 | 12/2004 | Knauerhase et al. |
| 2005/0081199 A1 | 4/2005 | Traut |
| 2006/0026411 A1 | 2/2006 | Yoshida |
| 2006/0053351 A1 | 3/2006 | Anderson et al. |
| 2006/0130062 A1 | 6/2006 | Burdick et al. |
| 2006/0136653 A1 | 6/2006 | Traut et al. |
| 2006/0277551 A1* | 12/2006 | Accapadi .............. G06F 9/5077 718/107 |
| 2008/0168447 A1 | 7/2008 | Lewis |

OTHER PUBLICATIONS

Engler, The Exokernal Operating System Architecture, Oct. 1998, pp. 28-35.

* cited by examiner

US 10,067,782 B2

EFFICIENT DETECTION AND RESPONSE TO SPIN WAITS IN MULTI-PROCESSOR VIRTUAL MACHINES

CROSS REFERENCE TO RELATED APPLICATIONS

This application is a continuation of U.S. patent application Ser. No. 12/182,971 filed on Jul. 30, 2008, the entire contents are incorporated herein by reference.

TECHNICAL FIELD

The presently disclosed subject matter relates to the field of computing, and more particularly, to computer virtualization, although virtualization is merely an exemplary and non-limiting field.

BACKGROUND

Operating system kernels provide several mechanisms to synchronize data structures in multi-threaded systems. Many of these mechanisms use a technique called spin waiting, where a thread or processor will spend time in a loop waiting for a particular event to occur before it continues execution. Spin waits are typically used in cases where wait times will be much less than the cost of re-scheduling threads or where the environment is such that the thread scheduler cannot run.

Examples of synchronization primitives that use this technique include, but are not limited to: spinlocks, queued spinlocks, reader/writer locks, and barriers. In general, well-designed operating systems will minimize the amount of time threads spend in regions of code that lead to these spin wait loops, since the time spent spin waiting is wasted time. At best, in the case of hyper-threading, some of a thread's resources are given to another hyper-thread, but such a thread is still blocked from making forward progress.

Furthermore, the assumption that spin waits will be performed only for short durations can be unintentionally broken when an operating system is running in a virtual machine environment. Consequently, the time spent spin waiting can increase greatly in virtual machine environments and can prevent a virtual machine from making forward progress.

Gang scheduling, in which all virtual processors of a virtual machine are scheduled in tandem, has been used in the past to avoid lock problems (resulting from spin waits). However, this approach often does not make efficient use of the physical system's processor(s). Gang scheduling can create un-schedulable holes where none of the sets of virtual processors from de-scheduled virtual machines will fit into given resources.

Furthermore, requiring all of the virtual processors from a virtual machine to run at the same time and for the same duration can result in cases where some of the virtual processors have no work to do but will run anyway. Both of these issues, long spin waits and gang scheduling, lead to under-utilization of system processors and significant throughput reductions. Thus, other techniques are needed in the art to solve the above described problems.

SUMMARY

Various aspects are disclosed herein for attenuating spin waiting in a virtual machine environment comprising a plurality of virtual machines and virtual processors. Selected virtual processors can be given time slice extensions in order to prevent such virtual processors from becoming de-scheduled (and hence causing other virtual processors to have to spin wait). Selected virtual processors can also be expressly scheduled so that they can be given higher priority to resources, resulting in reduced spin waits for other virtual processors waiting on such selected virtual processors. Finally, various spin wait detection techniques can be incorporated into the time slice extension and express scheduling mechanisms, in order to identify potential and existing spin waiting scenarios.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Figure 1:
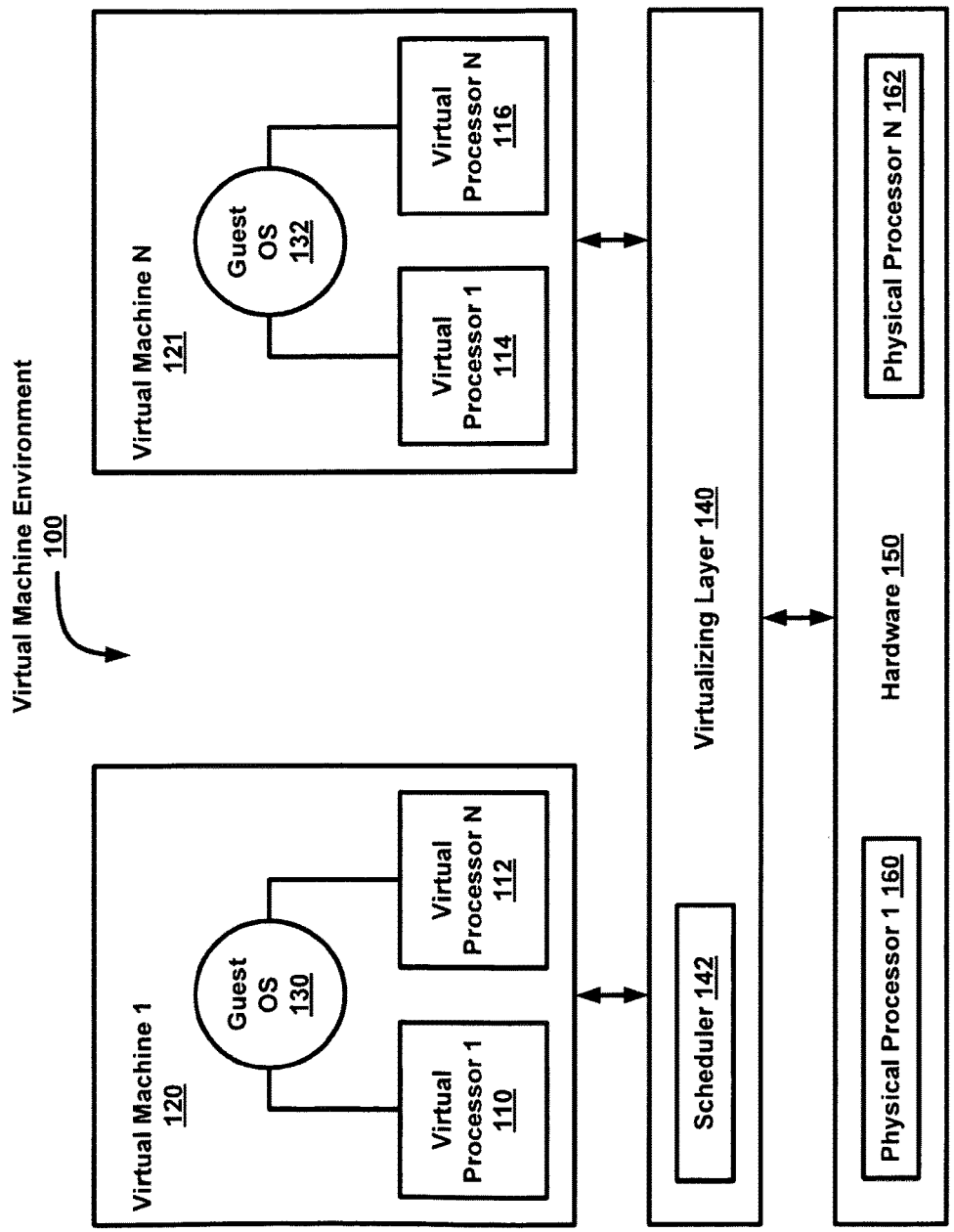
FIG. 1 illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

FIG. 1 illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162. Specifically, regarding the presently disclosed subject matter, optimization mechanisms are disclosed in FIGS. 2-10, in order to efficiently schedule the virtual processors 110, 112, 114, 116 that execute threads on the underlying physical processors 160, 162. In one example, such mechanisms teach how to attenuate any virtual processors that may be spin waiting when trying to acquire spinlocks.

Spin waiting occurs when a thread (or an underlying processor configured to execute a thread) spends time in a loop waiting for a particular event to occur before it continues execution. This may happen when one thread is waiting to acquire a lock on a resource when another thread has acquired (but not yet released) the lock. In regard to virtualization, spin waiting can occur upon an attempt to enter a synchronization section that a de-scheduled virtual processor is executing.

Figure 2:
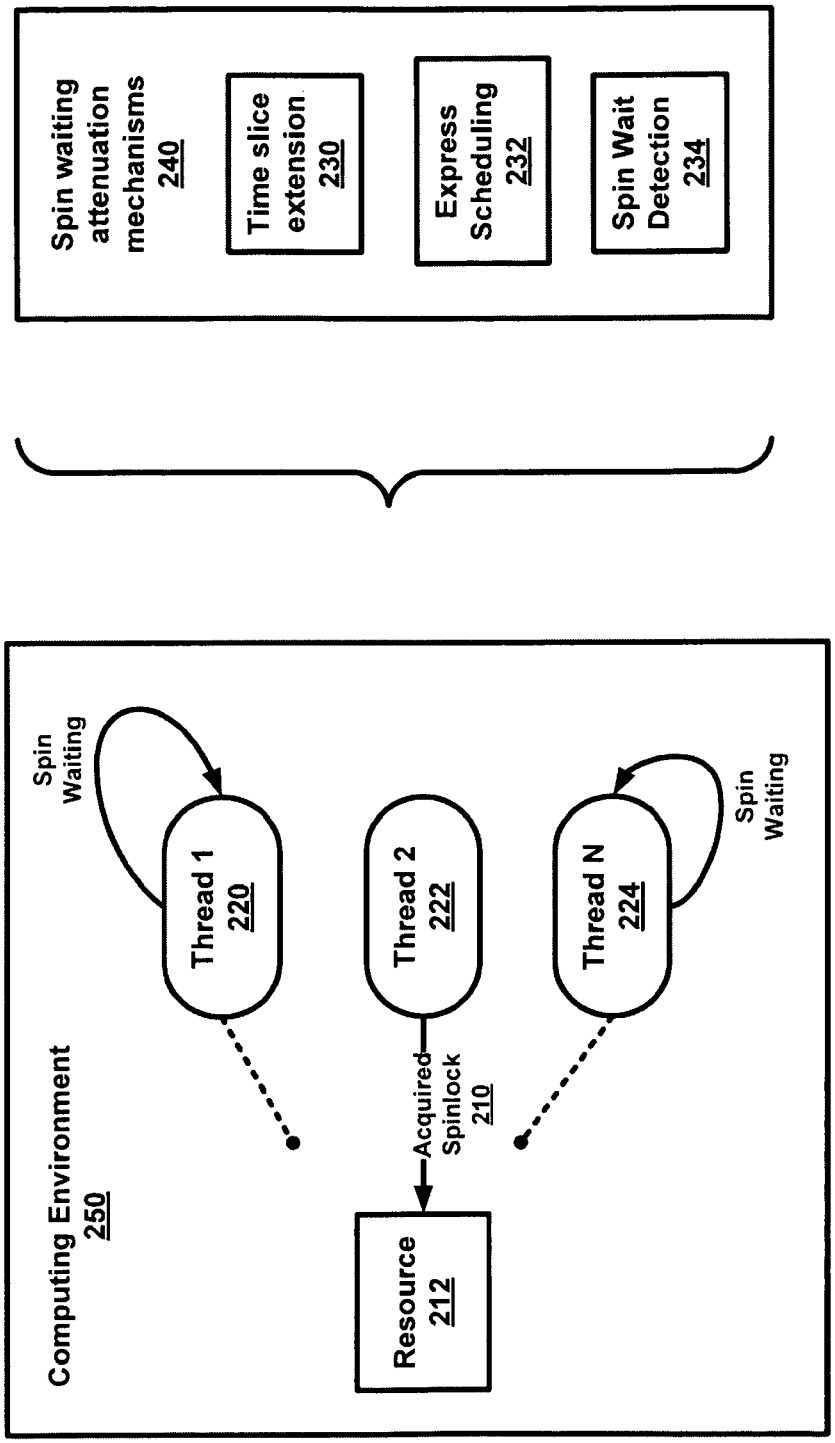
FIG. 2 illustrates various spin waiting attenuation mechanisms that reduce spin waiting via time slice extension, express scheduling, and spin wait detection.

In order to remedy such spin waiting, FIG. 2 illustrates various spin waiting attenuation mechanisms that reduce spin waiting via time slice extension 230, express scheduling 232, and spin wait detection 234. Per FIG. 2, a computing environment 250, which may include a multi-threading, a super-threading, or a hyper-threading environment, may have a plurality of threads 220, 222, 224 to be executed. If one of these threads, such as thread 2 222, has acquired a spinlock 210 to a resource 212 (e.g. an underlying physical processor 160, 162), the other threads 220, 224 have to wait until thread 2 222 releases the lock. Thus, thread 1 220 and thread N 224 will spin wait in a loop until thread 2 222 has finished.

It will be readily appreciated by those skilled in the art that the presently described mechanisms are not limited to typical spinlocks 210, but rather also contemplate queued spinlocks, reader/writer locks, barriers, and so on. The presently shown spin attenuation mechanisms 240 include various aspects described in more detail below, but in general terms they include: time slice extension 230, where virtual processors that have acquired spinlocks are given a time slice extension so that they can finish their task before being de-scheduled; express scheduling 232, where virtual processors can be prioritized by switching context to such virtual processors so that they can run before any other processors; and, spin wait detection mechanisms 234 that can identify or at least guess at when spin waiting might become an issue, and then engage in either time slice extension 230 and/or express scheduling 232.

Figure 3:
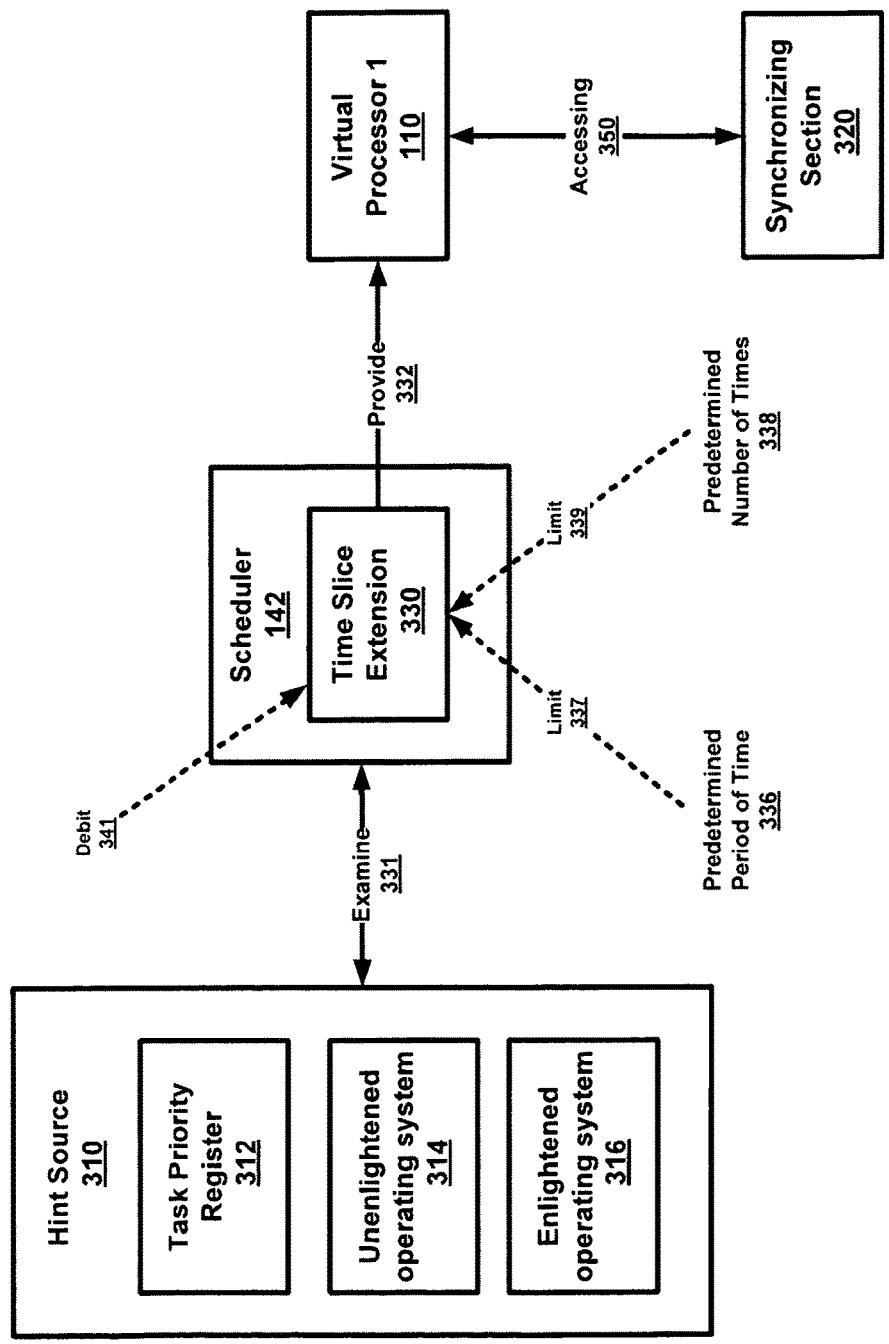
FIG. 3 illustrates time slice extension mechanisms in order to attenuate the spin waiting of virtual processors in a virtual machine environment.

FIG. 3 illustrates time slice extension mechanisms in order to attenuate the spin waiting of virtual processors in a virtual machine environment. The presently disclosed aspects can be implemented as systems, methods, computer executable instructions residing in computer readable media, and so on. Thus, any disclosure of any particular system, method, or computer readable medium is not confined there to, but rather extends to other ways of implementing the disclosed subject matter.

Turning to FIG. 3, a hint source 310 may be examined 331 by a scheduler 142 running in a virtualizing layer 140 (although other software modules may also perform this function independently or in conjunction with the scheduler 142). The hint source 310 can be a source for hints in order to determine if a virtual processor 110 is accessing 350 a synchronizing section 320. The synchronizing section may be a region of code that determines access to resources by virtual processors. Thus, a virtual processor that is accessing 350 a synchronizing section 320 may have acquired a lock on a resource (such as memory or a processor).

The scheduler 142 can provide 332 a time slice extension 330 to the virtual processor 110 if the virtual processor 110 is accessing 350 the synchronizing section 320. Moreover, the scheduler 142 can also limit 337 the time slice extension 330 to a predetermined period of time 336; and, it may limit 339 the granting of the time slice extension 330 to a predetermined number of times 338. This may be done in order to assure that the other virtual processors and other devices are not starved for resources. Finally, the scheduler 142 can debit 341 the time slice extension 330 granted to the virtual processor 110 from a subsequent time slice granted to the virtual processor. Thus, at the next time slice or some subsequent time slice, the virtual processor 110 can be given less time acquire a resource.

Regarding the hint source 310 itself, it can include any one of the following (or a combination thereof): (a) a task priority register 312, (b) an unenlightened guest operating system 314 state (which may include the task priority register 312), and (c) an enlightened operating system 316. The task priority register 312 is used by some operating systems to hold interrupt request levels. Since spinlocks 210 are typically acquired only at elevated interrupt request levels, examining the task priority register for elevated values provides a strong hint that virtual processors may be holding spinlocks. Alternatively, information exposed from enlightened guest operating systems, such as whether virtual processors are holding spinlocks or executing barrier sections that other virtual processors are waiting on, would be very accurate since such systems are aware of virtualization and have the resources to keep track of acquired spinlocks. Moreover, the typical unenlightened guest operating system could be examined for range of addresses where a thread holds a spinlock, user mode versus kernel mode state, various flags, and so on.

Figure 4:
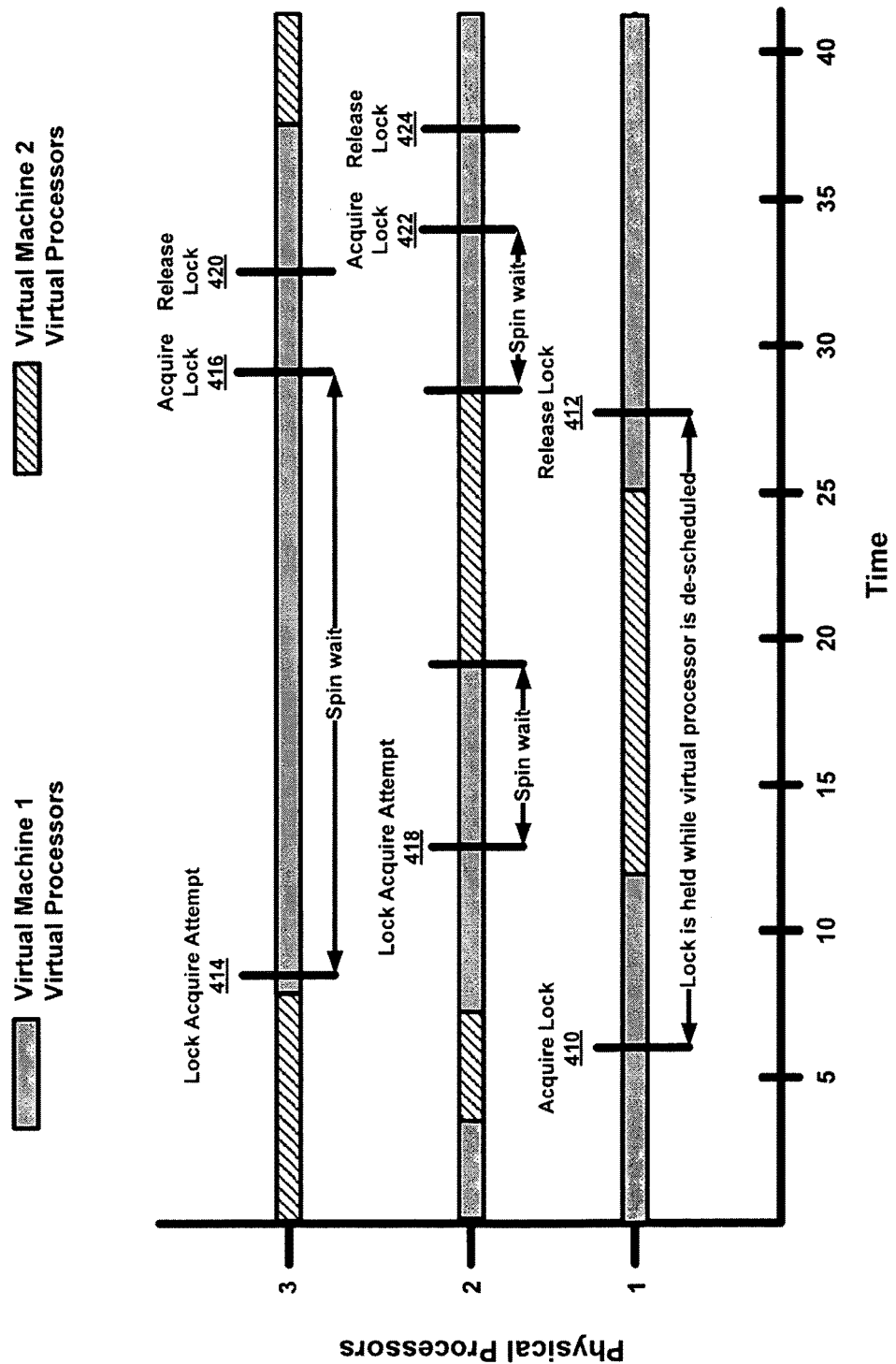
FIG. 4 provides a time line regarding how spin waiting can result in virtual processor scheduling congestion.
Figure 5:
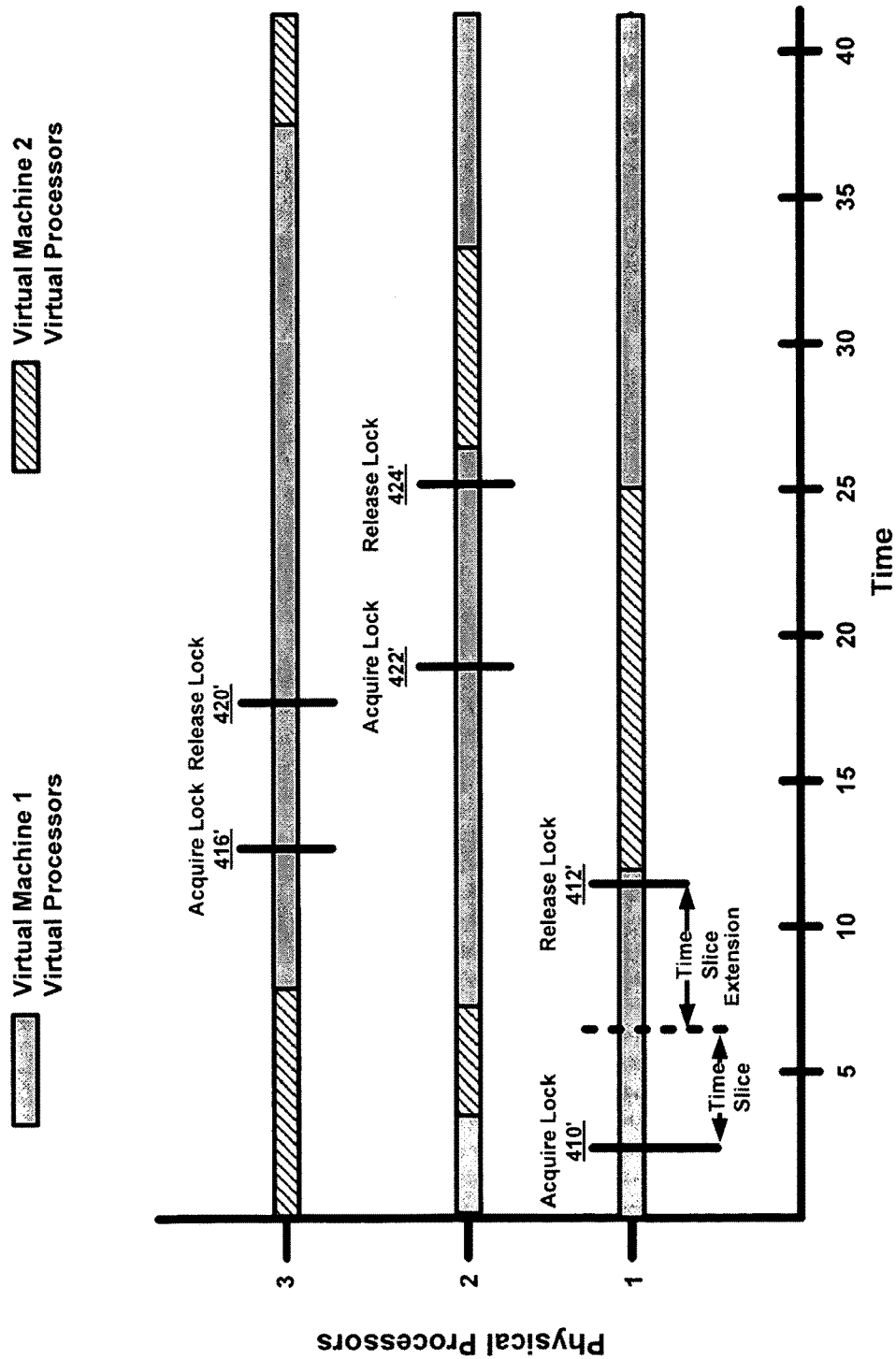
FIG. 5 shows how with time slice extensions, the problems illustrated in FIG. 4 can be obviated.

FIG. 4 provides a time line regarding how spin waiting can result in virtual processor scheduling congestion, while FIG. 5 shows how with time slice extension the problems illustrated in FIG. 4 can be obviated. Turning first to FIG. 4, three physical processors are shown as being available (y-axis) over some period of time (x-axis). These physical processors can be available for virtual machine 1 (having a number of virtual processors) and virtual machine 2 (also having a number of virtual processors). Starting with physical processor 1, a virtual processor running on the physical processor can acquire a lock 410, and this lock is held by the virtual processor while it is de-scheduled. This causes the other virtual processors to spin wait: the virtual processor running on physical processor 3 can keep try to acquire a lock 414 but it will fail and thus spin wait; likewise, the virtual processor running on physical processor 2 will also spin wait because it will fail to acquire a lock 418.

Only when the first virtual processor releases the lock 412, can the other virtual processors acquire locks: the second virtual processor will eventually acquire a lock 416 and then release it 420, and the remaining virtual processor will acquire a lock 422 and then release it 424. But, this way of scheduling virtual processors causes congestion and excessive spin waiting.

Figure 6:
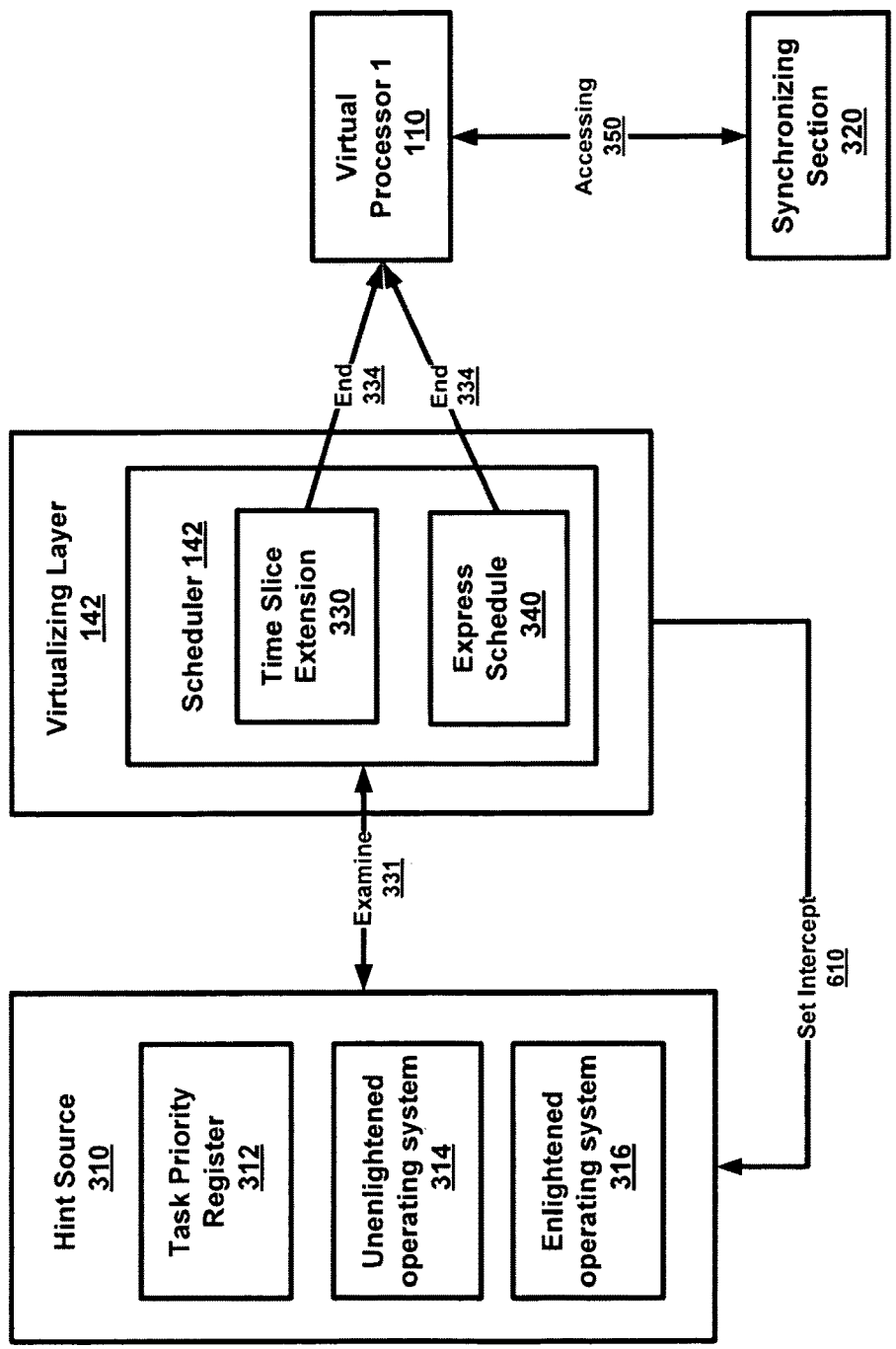
FIG. 6 shows that time slice extensions can be controlled to ensure resource parity among virtual processors.

In contrast, FIG. 5 illustrates how with time slice extension the problems illustrated in FIG. 4 can be obviated (or at least greatly attenuated). In FIG. 5, the first virtual processor (running on physical processor 1) can acquire a lock 410' for a certain time slice, but then it can receive an additional time slice extension and release 412' a spinlock at a later time then it would have without the extension. This way of prolonging time slices can have the benefit for having the second virtual processor and the third virtual processor execute in a more timely manner (and spin wait less). Thus, in contrast to FIG. 4, in FIG. 5, the third virtual processor can acquire a lock 416' and release it 420' some time thereafter, and then the second virtual processor can acquire a lock 422' and release it 424'. It should be noted that the time slice extensions can be given discriminately based on hints gleaned from the hint source 310 (as opposed to being granted In the scenario when time slice extensions are granted, it is desirable to make sure that such extensions are not too long. Thus, FIG. 6 illustrates how time slice extensions can be controlled to ensure resource parity among virtual processors. A module in the virtualizing layer 140 can set an intercept 610 associated with said hint source 310 (and this may be one method for prematurely ending an extension; another method may include an enlightened operating system that can indicate when a synchronizing section has been cleared). Ending 334 of any time slice extension 330 prematurely can be based on receipt of the intercept from the hint source 310. In this way, the scheduler 142 can know that it is time to end an extension—otherwise a virtual processor with the time slice extension can keep on using the extension to the end (when it may not be desirable to do so). as a matter of course).

Figure 7:
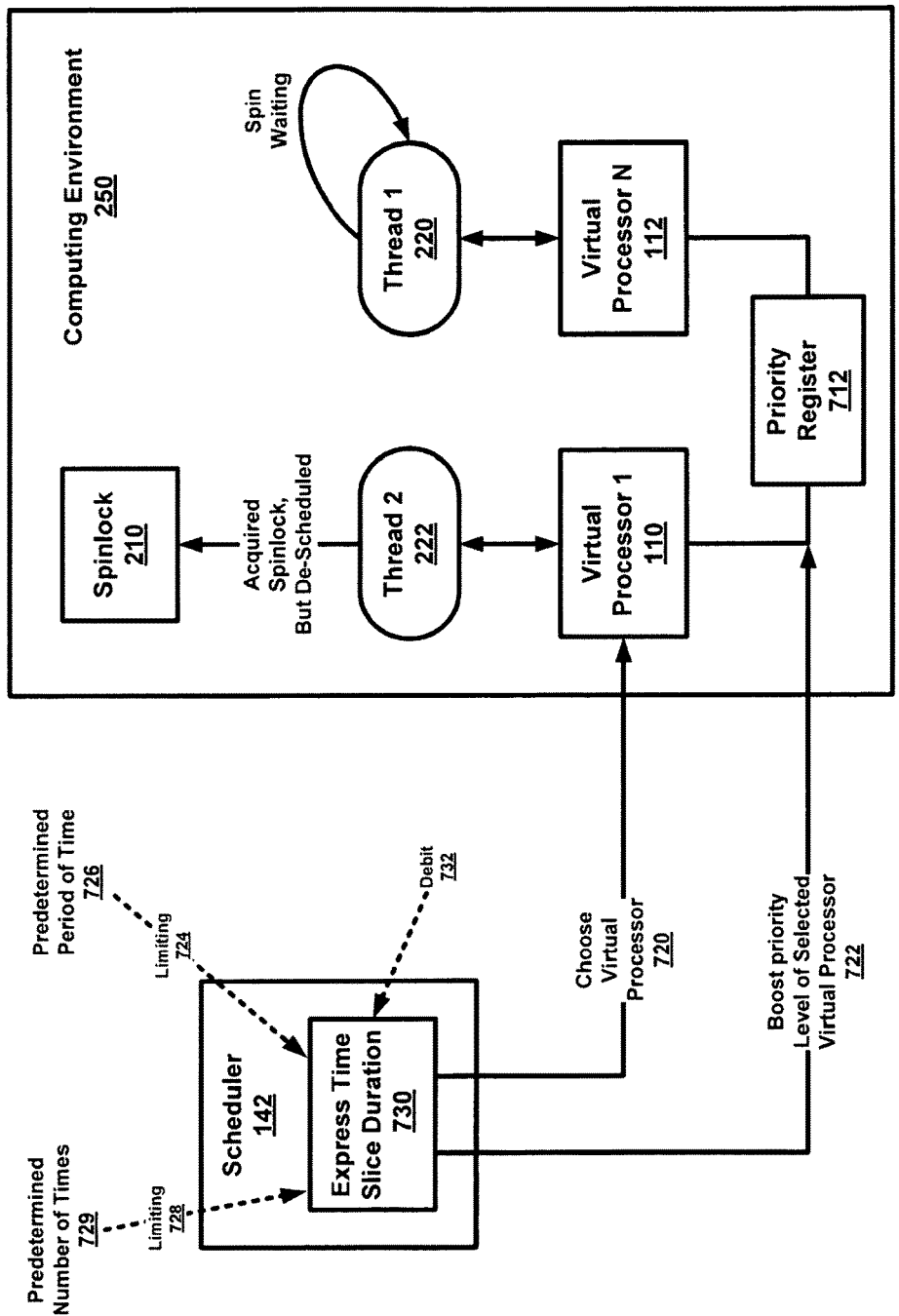
FIG. 7 illustrates the notion of express scheduling so that selected virtual processors are given priority to run.

Next, FIG. 7 illustrates the notion of express scheduling so that selected virtual processors are given priority to run. For example, a virtual processor 110 can be chosen 720 to run when the virtual processor 110 has been previously de-scheduled. Such choosing can include a context switch into the address space of the virtual processor 110. The priority of the virtual processor 110 can be increased or boosted to a predetermined level in order to increase the probability that the virtual processor 110 will run. However, a couple of limitations can also be put in place, such as: limiting 724 the express schedule time slice duration 730 to a predetermined period of time 726 in order to preserve resource parity among virtual processor and any other virtual processors (e.g., given current computing resources, the period of time could be 50 microseconds); and, limiting 728 a frequency of granting of the express schedule time slice duration 730 to a predetermined number of times 729 in order to preserve resource parity. Furthermore, any portion (or whole of) the express schedule time slice duration 730 can be debited 732 from any subsequent time slices associated with the virtual processor.

Figure 8:
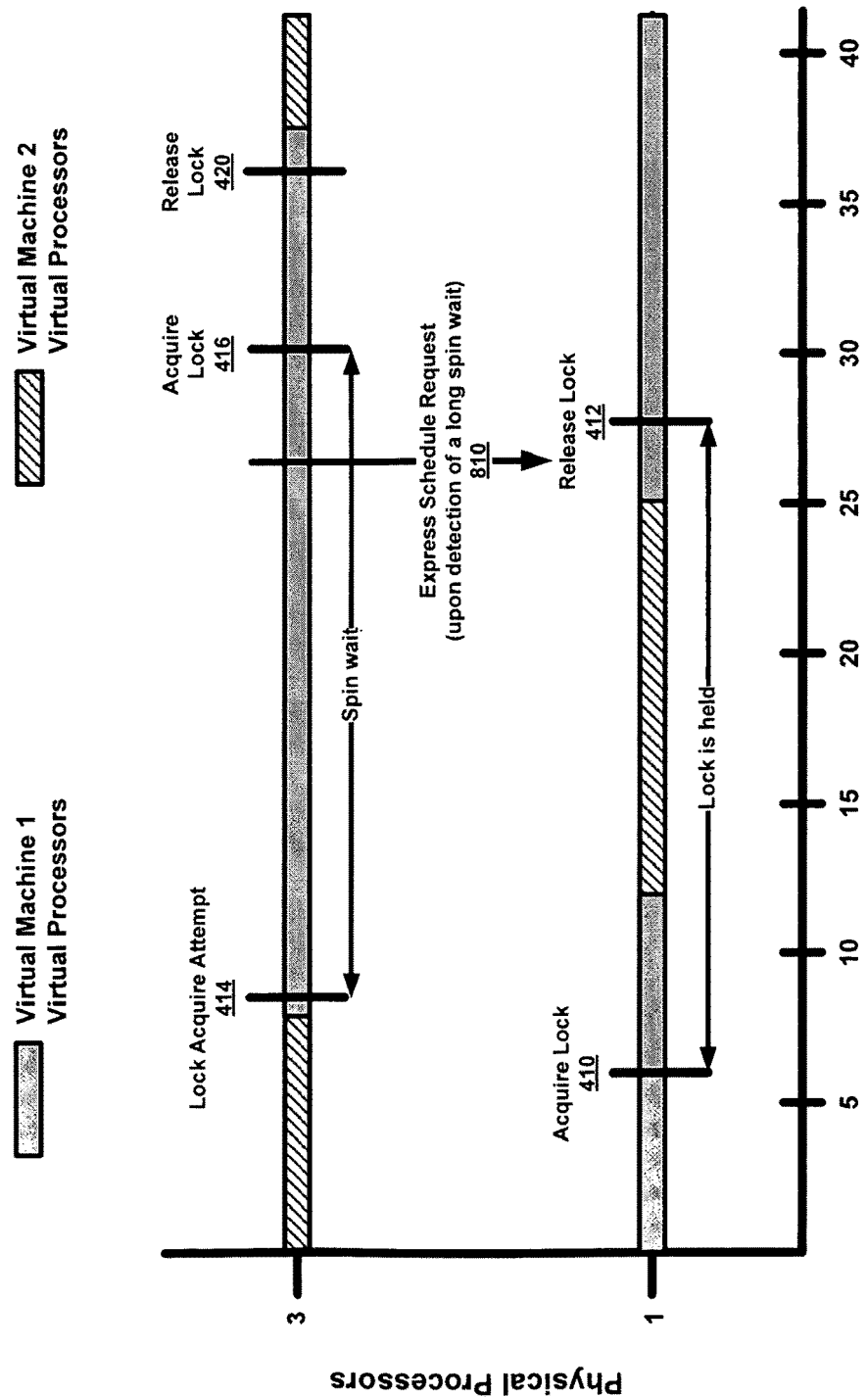
FIG. 8 provides an example of how express scheduling can work.

FIG. 8 provides a concrete example of how express scheduling can work. A first virtual processor corresponding to a physical processor 1 (y-axis), can acquire a lock 410, and this lock will be held by the first virtual processor until it is released 412. In the meantime, the third physical processor (corresponding to physical processor 3), will spin wait after attempting to acquire a lock 414 and it will not be successful at acquiring the lock for some time.

What FIG. 8 illustrates is that while the third virtual processor is spin waiting, an express schedule request 810 can be made upon detection of such a spin wait. The request 810 can result in a context switch to the first virtual processor so that it can finish its task and release the lock 412. Express scheduling allows the first virtual processor to gain priority (so that it can finish) and that eventually the third virtual processor can start its task and minimize the spin wait. Thus, per FIG. 8, once the first virtual processor releases its lock 412, the third virtual processor can acquire the lock 416 and then eventually release the lock 420.

In another aspect of the presently disclosed subject matter, spin waits can be variously identified when virtual processors are run. Instructions used to pace virtual processors in virtual machines can be intercepted 910. These may include "PAUSE" instructions in certain architectures, such as x86. Information about said instructions can be recorded 912. Then, some time afterwards, a history of this information about the instructions can be examined 914 in order to detect a pattern that correlates with long spin waits. Finally, long spin waits can be indicated 916 to various modules (such as express scheduling modules referenced above) if a particular pattern from a plurality of patterns is identified.

In various exemplary implementations, the long spin waits can be indicated to a scheduler that performs context switches to the first virtual processor mentioned above (i.e. the processor that has been de-scheduled). As for the pattern, it can indicate no spin waits when the number of the instructions are below a first predetermined standard (some heuristically determined number), and where the pattern can indicate spin waits when the number of the instructions are above a second predetermined standard 918 (some other heuristically determined number). Of course, these are merely exemplary (and hence non-limiting) aspects that could be additionally supplemented or substituted by any of the other aspects discussed herein.

Figure 9:
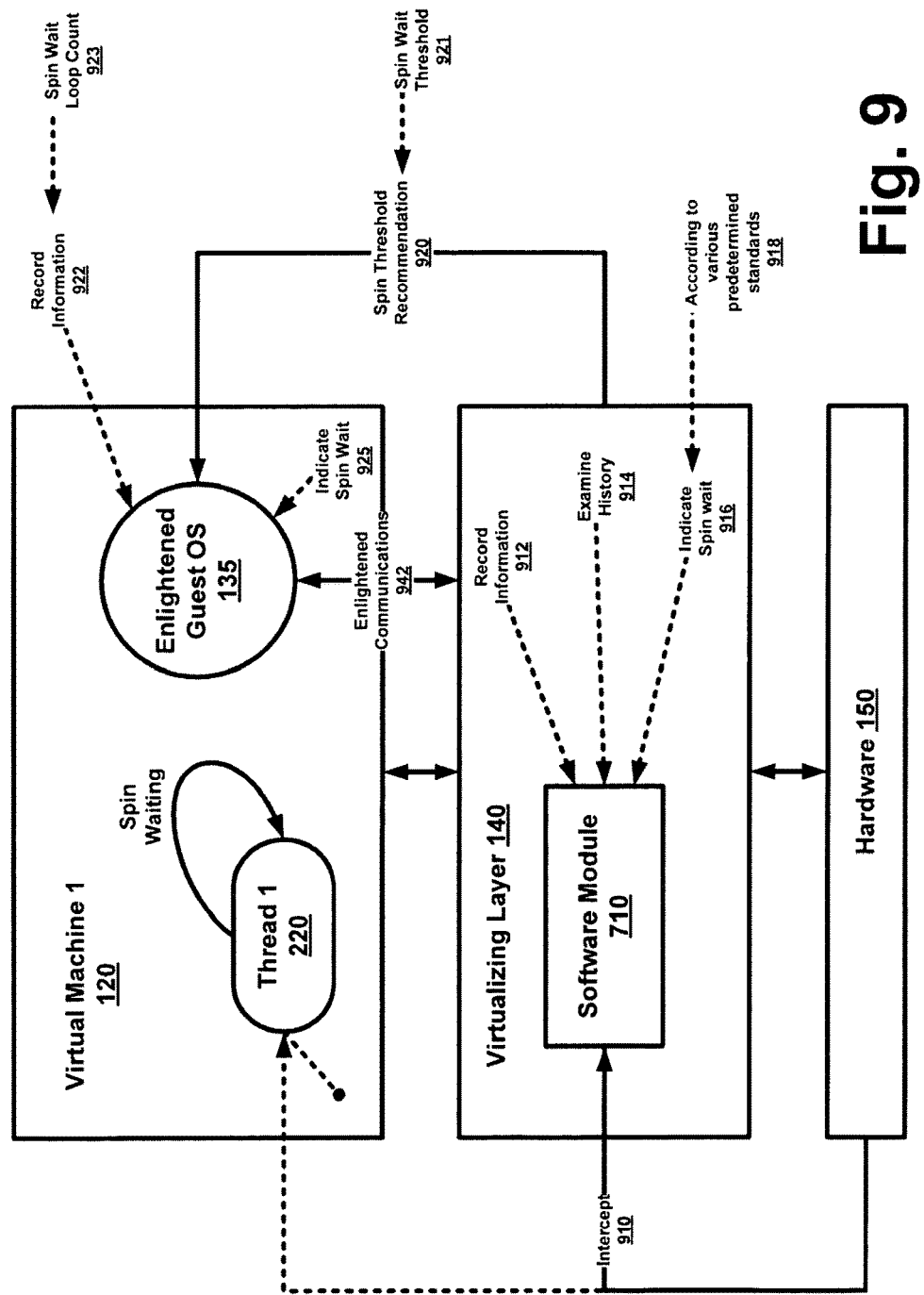
FIG. 9 illustrates an enlightened guest operating environment interacting with a virtualization layer in order to reduce spin waits.
Figure 10:
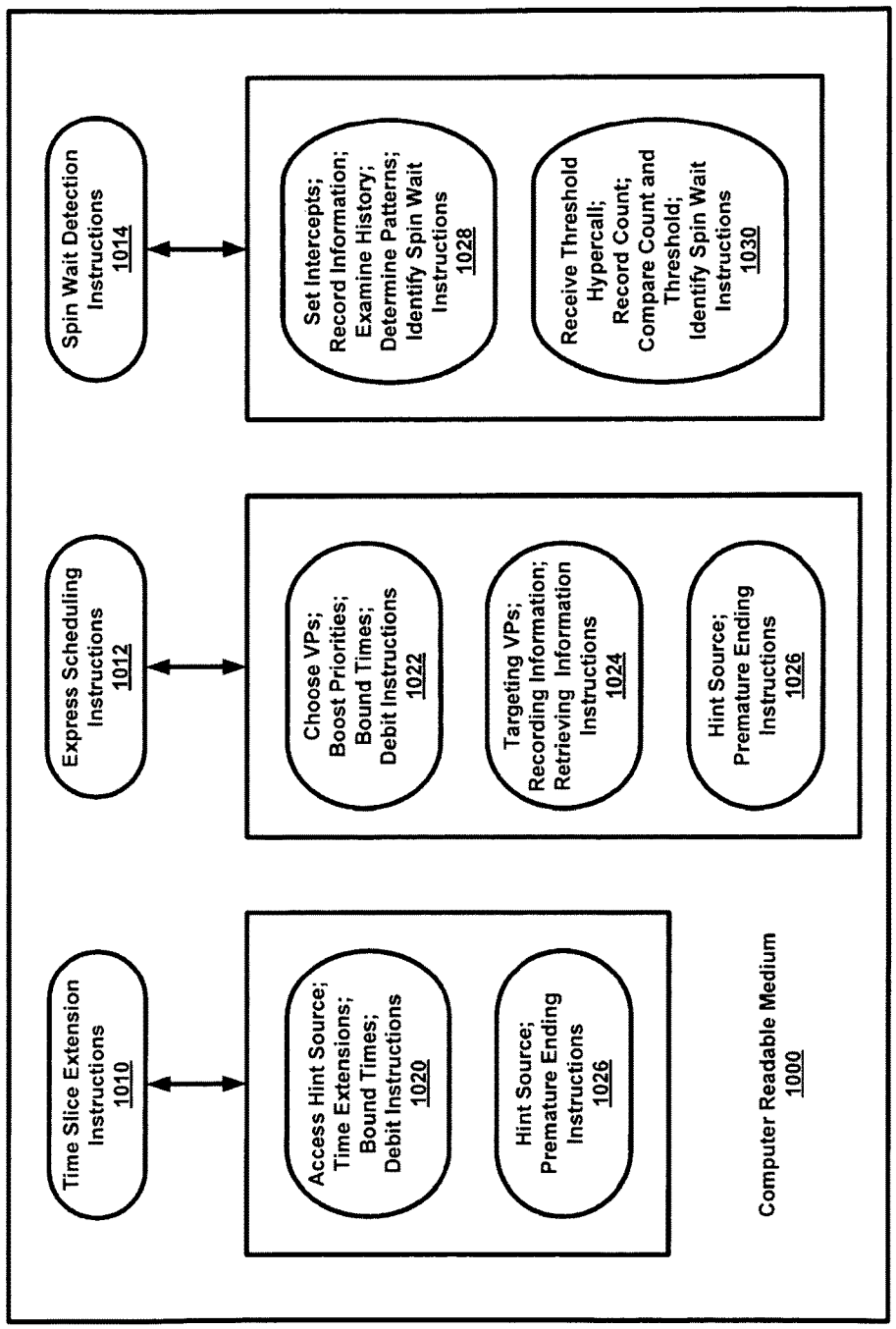
FIG. 10 illustrates a computer readable medium bearing computer executable instructions discussed with respect to FIGS. 1-9, above.

FIG. 9 illustrates another aspect of the presently disclosed subject matter, including identifying spin waits prior to the above mentioned choosing of running virtual processors, where the identifying is a basis for the choosing of the virtual processors. Per FIG. 9, an enlightened guest OS 135 is configured to receive recommendations 920 from a virtualizing layer 140 regarding spin wait thresholds 921. Then, the enlightened guest operating system 135 can be further configured to record information 922 regarding spin wait loop counts 923 as part of a spinlock acquire process. Next, it is configured to compare the spin wait loop count 923 to the spin wait thresholds 921. Finally, it is configured to indicate 925 long spin waits if the spin wait loop counts exceed the spin wait thresholds. It should be noted that a sophisticated guest operating system can also tune these thresholds based on the behavior of specific locks.

Any of the above mentioned aspects can be implemented in methods, systems, computer readable media, or any type of manufacture. For example, per FIG. 10, a computer readable medium can store thereon computer executable instructions for attenuating spin waiting of virtual processors in a virtual machine environment. Such media can comprise a first subset of instructions for providing time slice extensions to a plurality of virtual processors 1010; a second subset of instructions for providing express scheduling to the plurality of virtual processors 1012; and a third subset of instructions for detecting spin waiting in any of the plurality of virtual processors, where the third subset of instructions is combinable with the first subset of instructions and with the second subset of instructions in order to attenuate spin waiting 1014. It will be appreciated by those skilled in the art that additional sets of instructions can be used to capture the various other aspects disclosed herein, and that the three presently disclosed subsets of instructions can vary in detail per the present disclosure.

For example, the first subset of instructions can further comprise instructions 1020 for: accessing a hint source regarding whether a virtual processor of the plurality of virtual processors has acquired a spinlock; providing the virtual processor with a time extension in order to at least prevent the at least one processor from becoming de-scheduled; bounding the time extension to a predetermined amount of time; bounding the granting of the time extension to a predetermined number of times; and debiting the time extension from any subsequent time slices.

Again, by way of example, the second subset of instructions can further comprise instructions for: choosing a set of virtual processors from the plurality of virtual processors to run per an express schedule request; boosting priorities of the set of virtual processors resulting in the set of virtual processors running to comply with the express schedule request; bounding the express schedule request to a predetermined time slice duration; bounding the express schedule request to a predetermined number of times; and debiting any time associated with the express schedule request from any subsequent time slices of the set of virtual processors.

The second subset of instructions can further comprise instructions for: targeting the set of virtual processors that are de-scheduled virtual processors; recording information about the set of virtual processors; and retrieving information when spin waits are identified and passing any detection of the spin waits to a virtualizing layer expressly running the set of virtual processors. Moreover, the second subset of instructions can further comprise instructions for: receiving hints from a hint source when a synchronization session is accessed; and, based on such hints, prematurely end any time slice additional to time slices associated with the set of virtual processors.

Similarly to the first and second subset of instructions, the third subset of instructions can further comprise instructions for: setting intercepts for monitoring a predetermined instruction set used to pace the plurality of virtual processors; recording information regarding the predetermined instruction set; examining a history of the recorded predetermined instruction set; determining any patterns in the history; and identifying a spin wait based on the patterns. The third subset, moreover, can further comprises instructions for: receiving via hypercalls (i.e. notifications) from a virtualizing layer a recommended threshold for determining spin waits of the plurality of virtual processors; recording an iteration count of a spin wait loop; comparing the iteration count to the recommended threshold; and identifying a spin wait associated with a virtual processor from the plurality of virtual processors if the iteration count exceeds the recommended threshold. The first, second, and third subset of instructions can attenuate spin waits for a plurality of virtual processors distributed across a plurality of virtual machines and in a plurality of virtual machine environments.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for efficient detection and response to spin waits in multi-processor virtual machines. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for attenuating waiting times of virtual processors in a virtual machine environment, comprising:
    examining a hint source for hints to determine if a virtual processor is accessing a synchronizing section that acquires a lock on an underlying physical resource that causes any other virtual processors to wait until the virtual processor releases the lock, the synchronizing section being a region of code that determines access to resources by virtual processors; and
    providing a time slice extension to the virtual processor to increase the time allotted in its assigned time slice if the virtual processor is accessing the synchronizing section.

2. The method according to claim 1, wherein the hint source is at least one of: a task priority register, an unenlightened guest operating system that is inspected, and an enlightened operating system.

3. The method according to claim 1, further comprising:
    a scheduler residing in a virtualizing layer that is configured to provide the time slice extension to the virtual processor.

4. The method according to claim 3, wherein the scheduler is further configured to limit the provided time slice extension to the virtual processor by limiting the time slice extension to a predetermined period of time or limiting the number of time slice extensions granted to a predetermined number of times.

5. The method according to claim 3, wherein the scheduler is further configured to debit the time slice extension granted to the virtual processor such that the virtual processor has less allocated time in a subsequent time slice.

6. The method according to claim 3, wherein the scheduler is further configured to end the time slice extension based at least in part from information received by the hint source.

7. The method according to claim 1, wherein the lock is at least one of: a spinlock, a queued spinlock, a reader/writer lock, and a barrier.

8. A system for attenuating waiting times of virtual processors in a virtual machine environment, comprising:
    a processor; and
    a memory communicatively coupled to the processor and storing instructions that upon execution by the processor cause the system to:
        examine a hint source for hints to determine if a virtual processor is accessing a synchronizing section that acquires a lock on an underlying physical resource that causes any other virtual processors to wait until the virtual processor releases the lock, the synchronizing section being a region of code that determines access to resources by virtual processors; and
        provide a time slice extension to the virtual processor to increase the time allotted in its assigned time slice if the virtual processor is accessing the synchronizing section.

9. The system according to claim 8, wherein the hint source is at least one of: a task priority register, an unenlightened guest operating system that is inspected, and an enlightened operating system.

10. The system according to claim 8, further comprising:
    a scheduler residing in a virtualizing layer that is configured to provide the time slice extension to the virtual processor.

11. The system according to claim 10, wherein the scheduler is further configured to limit the provided time slice extension to the virtual processor by limiting the time slice extension to a predetermined period of time.

12. The system according to claim 10, wherein the scheduler is further configured to limit the provided time slice extension to the virtual processor by limiting the number of time slice extensions granted to a predetermined number of times.

13. The system according to claim 10, wherein the scheduler is further configured to debit the time slice extension granted to the virtual processor such that the virtual processor has less allocated time in a subsequent time slice.

14. The system according to claim 10, wherein the scheduler is further configured to end the time slice extension based at least in part from information received by the hint source.

15. The system according to claim 10, wherein the lock is at least one of: a spinlock, a queued spinlock, a reader/writer lock, and a barrier.

16. A system for attenuating waiting times of virtual processors in a virtual machine environment, comprising:
   a processor; and
   a memory communicatively coupled to the processor and storing instructions that upon execution by the processor cause the system to:
      identify one or more virtual processors that will access a synchronizing section, wherein the one or more identified virtual processors are configured to acquire a lock on an underlying physical resource that causes any other virtual processors to wait;
      determine an express schedule that prioritizes the one or more identified virtual processors;
      select a virtual processor from the one or more virtual processors to run based on the prioritized express schedule; and
      provide a time slice duration for the selected virtual processor.

17. The system according to claim 16, wherein the instructions that upon execution by the processor cause the system to determine an express schedule that prioritizes the one or more identified virtual processors further comprise instructions that upon execution by the processor cause the system to:
   boost a predetermined level of priority for a virtual processor such that the probability that the virtual processor will be selected to run is increased.

18. The system according to claim 16, wherein the time slice duration is limited to a predetermined period of time and debited from any subsequent time slices associated with the selected virtual processor.

19. The system according to claim 16, wherein the number of times the time slice duration is granted is limited to a predetermined number of times.

20. The system according to claim 16, wherein the lock is at least one of: a spinlock, a queued spinlock, a reader/writer lock, and a barrier.

* * * * *